US011842537B1

(12) United States Patent
Jain et al.

(10) Patent No.: US 11,842,537 B1
(45) Date of Patent: Dec. 12, 2023

(54) DEVICES, METHODS, AND GRAPHICAL USER INTERFACES FOR ANALYZING, LABELING, AND MANAGING LAND IN A GEOSPATIAL PLATFORM

(71) Applicant: AIDash Inc., San Jose, CA (US)

(72) Inventors: Pritesh Jain, Bengaluru (IN); Stephen A. Marland, Royal Leamington Spa (GB)

(73) Assignee: AIDash, Inc., San Jose, CA (US)

( * ) Notice: Subject to any disclaimer, the term of this patent is extended or adjusted under 35 U.S.C. 154(b) by 0 days.

(21) Appl. No.: 18/149,036

(22) Filed: Dec. 30, 2022

(51) Int. Cl.
*G06V 20/13* (2022.01)
*G06V 10/764* (2022.01)

(52) U.S. Cl.
CPC .......... *G06V 20/13* (2022.01); *G06V 10/764* (2022.01)

(58) Field of Classification Search
CPC .. G06N 3/08; G06N 7/01; G06N 5/04; G06N 3/045; G06N 3/084; G06N 20/00; G06N 3/04; G06N 3/043; G06N 3/088; G06N 3/126; G06N 20/10; G06N 20/20; G06N 3/048; G06N 3/02; G06N 3/044; G06N 5/02; G06N 7/02; G06N 3/047; G06N 3/082; G06N 3/004; G06N 3/006; G06N 5/01; G06N 3/0409; G06N 3/049; G06N 5/046; G06N 7/08
See application file for complete search history.

(56) References Cited

U.S. PATENT DOCUMENTS

| | | | |
|---|---|---|---|
| 11,120,692 B2 | 9/2021 | Aljuaid et al. | |
| 11,126,170 B2 | 9/2021 | Wilhelm et al. | |
| 11,132,102 B2 | 9/2021 | Kornmann et al. | |
| 11,132,377 B2 | 9/2021 | Hong | |
| 2007/0291994 A1* | 12/2007 | Kelle | G01C 11/00 382/110 |
| 2010/0040260 A1* | 2/2010 | Kelle | G06V 20/188 382/110 |
| 2011/0122138 A1* | 5/2011 | Schmidt | G06F 18/40 382/128 |
| 2020/0117959 A1* | 4/2020 | Sargent | G06T 7/10 |
| 2020/0242754 A1* | 7/2020 | Peters | G06Q 50/02 |

* cited by examiner

*Primary Examiner* — Alex Kok S Liew
(74) *Attorney, Agent, or Firm* — Ahmann Kloke LLP

(57) ABSTRACT

Example systems, methods, and non-transitory computer readable media are directed to determining a geographic location to be assessed; obtaining information associated with the geographic location, the information including at least one data point of the geographic location; classifying one or more habitats within the geographic location based on at least one machine learning model that processes the at least one data point of the geographic location; determining at least one respective metric for the one or more classified habitats based at least in part on the at least one data point of the geographic location; and providing an interface that includes at least a map of the geographic location and the at least one respective metric for the one or more classified habitats, the one or more classified habitats are visually segmented in the map by habitat type.

15 Claims, 16 Drawing Sheets

Example Land Assessment Result

| Metric | Biodiversity ▾ | | | | |
|---|---|---|---|---|---|
| Site Name | Area (ha) | ← Biodiversity unit | Biodiversity/Area | Opportunity Score | Change vs Baseline |
| Site 1001 Dev | 16.02 | 34.25 | 2.14 | 0 | 15% View |
| Site 1002 | 29.01 | 116.03 | 4.00 | 0 | 4% View |
| Site 1003 | 29.57 | 106.59 | 3.53 | 0 | 5% View |
| Site 1004 | 19.35 | 149.72 | 7.66 | 0 | 3% View |
| Site 1005 | 14.81 | 26.43 | 1.78 | 0 | 19% View |
| Site 1006 | 19.99 | 81.72 | 4.09 | 0 | 6% View |
| Site 1007 | 317.44 | 1119.81 | 3.53 | 0 | 0% View |

FIG. 3B

| Plan Name | Created At | Approved At | Est. Start Date | Est. End Date | Budget | Author | Site Name | Status |
|---|---|---|---|---|---|---|---|---|
| Arable reversal | 2022-03-23 | 2022-03-23 | 2027-03-23 | 2027-03-23 | £5,000 | Chris | Site 110 | Approved |
| Demo plan test | 2022-02-18 | NA | 2022-02-18 | 2022-02-18 | £1,000 | Admin | Site 106 | Rejected |
| Fen - Wetland restoration and arable conversion | 2022-03-23 | 2022-03-23 | 2022-03-23 | 2022-03-23 | £6,000 | Chris | Site 147 | Approved |
| plan test 1 | 2022-03-10 | NA | 2022-03-10 | 2022-03-10 | £100,000 | Chris | Site 101 | Rejected |
| Site 103 arable modification scrub and grassland creation | 2022-03-23 | 2022-03-24 | 2022-03-23 | 2022-03-23 | £10,000 | Chris | Site 130 | Approved |
| Site 109 - Management plan improve exiting habitats | 2022-04-28 | NA | 2022-04-28 | 2022-04-28 | £3,750 | Chris | Site 109 | Pending Approval |
| Site 109 - Modified grassland - neutral grassland restoration | 2022-03-22 | NA | 2022-03-22 | 2022-03-22 | £2,500 | Chris | Site 119 | Draft |
| Site 106 - planned changes | 2022-03-23 | NA | 2022-03-23 | 2022-03-23 | £5,000 | Chris | Site 146 | Pending Approval |

FIG. 3H

DEVICES, METHODS, AND GRAPHICAL USER INTERFACES FOR ANALYZING, LABELING, AND MANAGING LAND IN A GEOSPATIAL PLATFORM

FIELD OF THE INVENTION(S)

Embodiments of the present inventions relate generally to techniques for analyzing, labeling, and managing land in a geospatial platform.

BACKGROUND

Geographic regions, or land, throughout the world may need to be analyzed and monitored for a variety of reasons. For instance, a site (or parcel of land) may be analyzed to determine land use, which may indicate how the site is being used. As another example, a site may be analyzed to determine land cover, which may identify various habitats represented in the site. Such analyses may be helpful for land use planning and development. Often, sites may also need to be monitored over time, for example, to measure changes to an environment, evaluate environmental changes resulting from land conversions, or demonstrate regulatory compliance.

SUMMARY

Example systems, methods, and non-transitory computer readable media are directed to determining a geographic location to be assessed; obtaining information associated with the geographic location, the information including at least one data point of the geographic location; classifying one or more habitats within the geographic location based on at least one machine learning model that processes the at least one data point of the geographic location; determining at least one respective metric for the one or more classified habitats based at least in part on the at least one data point of the geographic location; and providing an interface that includes at least a map of the geographic location and the at least one respective metric for the one or more classified habitats, the one or more classified habitats are visually segmented in the map by habitat type.

According to some embodiments, the at least one data point of the geographic location is an aerial image, a satellite image, or a digital surface model image.

According to some embodiments, the at least one respective metric for the one or more classified habitats is determined based on a user-defined configuration that specifies one or more assessments to be performed in relation to the geographic location.

According to some embodiments, the at least one respective metric for the one or more classified habitats provides an area measurement determined for a classified habitat, the area measurement being determined based at least in part on an analysis of the at least one data point of the geographic location.

According to some embodiments, the at least one respective metric for the one or more classified habitats provides a biodiversity measurement determined for a classified habitat, the biodiversity measurement being determined based at least in part on an analysis of the at least one data point of the geographic location.

According to some embodiments, the at least one respective metric for the one or more classified habitats provides a carbon measurement determined for a classified habitat, the carbon measurement being determined based at least in part on an analysis of the at least one data point of the geographic location.

According to some embodiments, the at least one respective metric for the one or more classified habitats corresponds to an air quality metric, a flood risk metric, a timber metric, a food production metric, a pollination metric, a natural capital metric, a monetary value metric, a societal value metric, a tree count metric, or a tree height metric.

According to some embodiments, the interface provides options to manually re-classify the one or more habitats classified by the at least one machine learning model or adjust physical boundaries of the one or more classified habitats.

According to some embodiments, example systems, methods, and non-transitory computer readable media are further directed to providing a set of overall metrics associated with the geographic location in a region of the interface; determining a selection of a classified habitat in the map of the geographic location; and based on the selection of the classified habitat, updating the region of the interface to provide a set of metrics associated with the classified habitat.

According to some embodiments, example systems, methods, and non-transitory computer readable media are further directed to providing a visual graph in a region of the interface, wherein the visual graph illustrates changes to the at least one respective metric for the one or more classified habitats over a period of time.

Example systems, methods, and non-transitory computer readable media are directed to provide a graphical user interface that includes at least a map of a geographic location; provide one or more metrics associated with the geographic location in a region of the interface, wherein at least one metric is determined based on an data point of the geographic location that is processed by a machine learning model; determine a selection of a region in the map of the geographic location, wherein the selected region is designated for land conversion; determine changes to the one or more metrics associated with the geographic location in response to the region selected for land conversion; and provide information describing the changes to the one or more metrics in another region of the interface.

According to some embodiments, the interface provides an option to digitally draw physical boundaries of the region within the map of the geographic location.

According to some embodiments, the interface provides an option to specify new attributes for the region designated for land conversion, the new attributes including at least a new habitat type planned for the region.

According to some embodiments, the changes to the one or more metrics include one or more of: a change to a biodiversity measurement associated with the geographic location; a change to a carbon measurement associated with the geographic location; a change to an air quality measurement associated with the geographic location; a change to a flood risk measurement associated with the geographic location; a change to a timber measurement associated with the geographic location; a change to a food production measurement associated with the geographic location; a change to a pollination measurement associated with the geographic location; a change to a natural capital measurement associated with the geographic location; a change to a monetary value measurement associated with the geographic location; a change to a societal value measurement associated with the geographic location; or a change to a tree measurement associated with the geographic location.

According to some embodiments, example systems, methods, and non-transitory computer readable media are further directed to providing read-only access to the interface to at least one third-party tasked with approving the land conversion.

BRIEF DESCRIPTION OF THE DRAWINGS

FIGS. 3A-3I illustrate example interfaces according to some embodiments.

DETAILED DESCRIPTION

Geographic regions, or land, throughout the world may need to be analyzed and monitored for a variety of reasons. For example, a survey may be conducted to determine topographical features associated with a parcel of land. The survey may result in a written document or drawing that provides various dimensions (e.g., shape, boundaries, or the like) of the parcel and its physical features, including natural and manufactured features.

In another example, a development survey may be conducted before altering a parcel of land, for example, as part of a new development project planned for the parcel. The survey may involve environmental considerations, such as impact assessments, to study environmental consequences that may result from the proposed development. For example, a parcel of land may be subject to a land conversion project that replaces a forest habitat with grassland. In this example, an environmental assessment may attempt to measure an impact of the land conversion project, for example, in terms of air quality or carbon footprint.

Figure 1A:
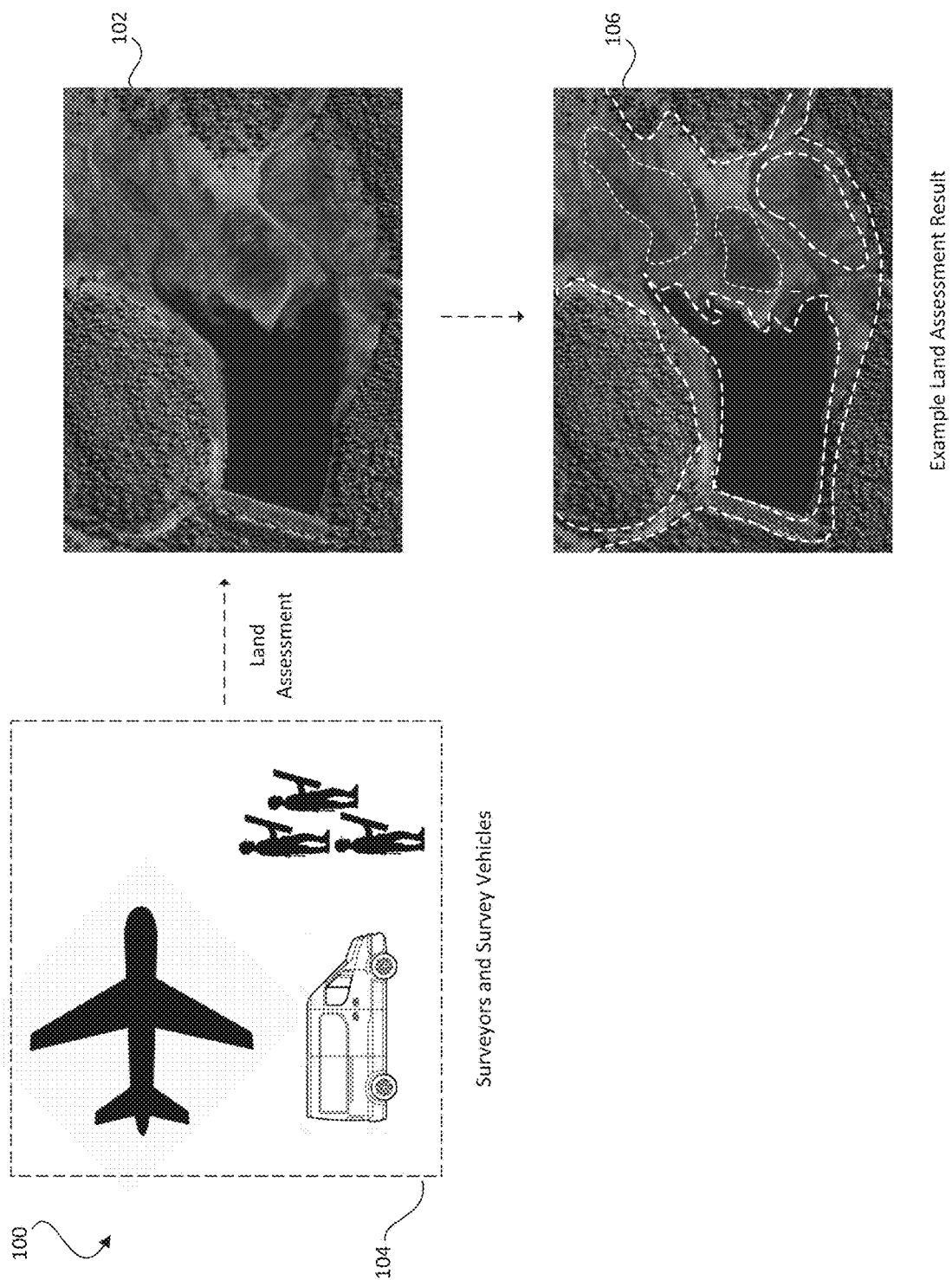
FIG. 1A depicts a conventional process for assessing a parcel of land.

FIG. 1A illustrates an example process 100 for assessing a parcel of land 102. The parcel of land 102 may be assessed by various land surveyors and/or survey vehicles 104. For instance, the parcel of land 102 may be assessed by human surveyors that may physically traverse the parcel of land 102 to determine, for example, land shape, boundaries, and topography. The survey may also involve vehicles with specialized equipment to conduct the survey.

When assessing the parcel of land 102, surveyors may need to evaluate additional sources of information, such as aerial imagery of the parcel of land 102 or pre-existing land resources, such as topographic maps. The assessment process may span weeks or even months, as surveyors study their observations and reconcile their findings with the additional sources of information.

Once the assessment is complete, the surveyors may provide a written document or drawing that maps the parcel of land 102 and its related features. For example, in FIG. 1A, an example drawing 106 of the parcel of land 102 is determined. The drawing 106 may provide various classifications of environmental features present in the parcel of land 102, such as water bodies, habitats, roads, and boundaries, for example.

Such conventional approaches to land assessment may not be practical, especially when assessing remote or large parcels of land. For example, when assessing a large site, multiple surveyors and related resources may be needed to accurately map and classify the site. This survey may provide a point-in-time representation of the site, which may become stale over time as environmental features and conditions present during the initial assessment change. For example, the site may change over time due to naturally occurring phenomena. As an example, the site may experience significant growth in vegetation that drastically alters measurements that were previously determined for the site by the surveyors. As another example, the site may experience a significant loss in vegetation due to wildfires, which may result in deviations from measurements previously determined for the site by the surveyors.

In some instances, geographic locations may be subject to monitoring and observation, for example, due to environmental regulatory requirements or land use compliance requirements. For example, as part of a government grant, a parcel of land used for farming may be in the process of being converted as a wildlife haven. In this example, multiple assessments of the parcel of land would need to be conducted over time to measure conversion progress. Further assessments may need to be conducted to gain additional insights relating to the parcel. As examples, additional surveys may need to be conducted to measure biodiversity within the wildlife haven, calculate carbon credits resulting from the conversion, and classify habitats within the wildlife haven.

Given the limitations associated with conventional approaches to land assessment, there exists a need for a solution that can be used to analyze, plan, and monitor geographic regions without having to continually deploy significant resources to re-assess the geographic regions and measure resulting changes.

Various embodiments described herein provide a claimed solution rooted in computer technology that solves a problem arising in the realm of computer technology. In various embodiments, systems and methods discussed herein provide a geospatial platform that applies machine learning techniques to land assessment, planning, and monitoring, thereby improving land assessment accuracy and efficiency.

Figure 1B:
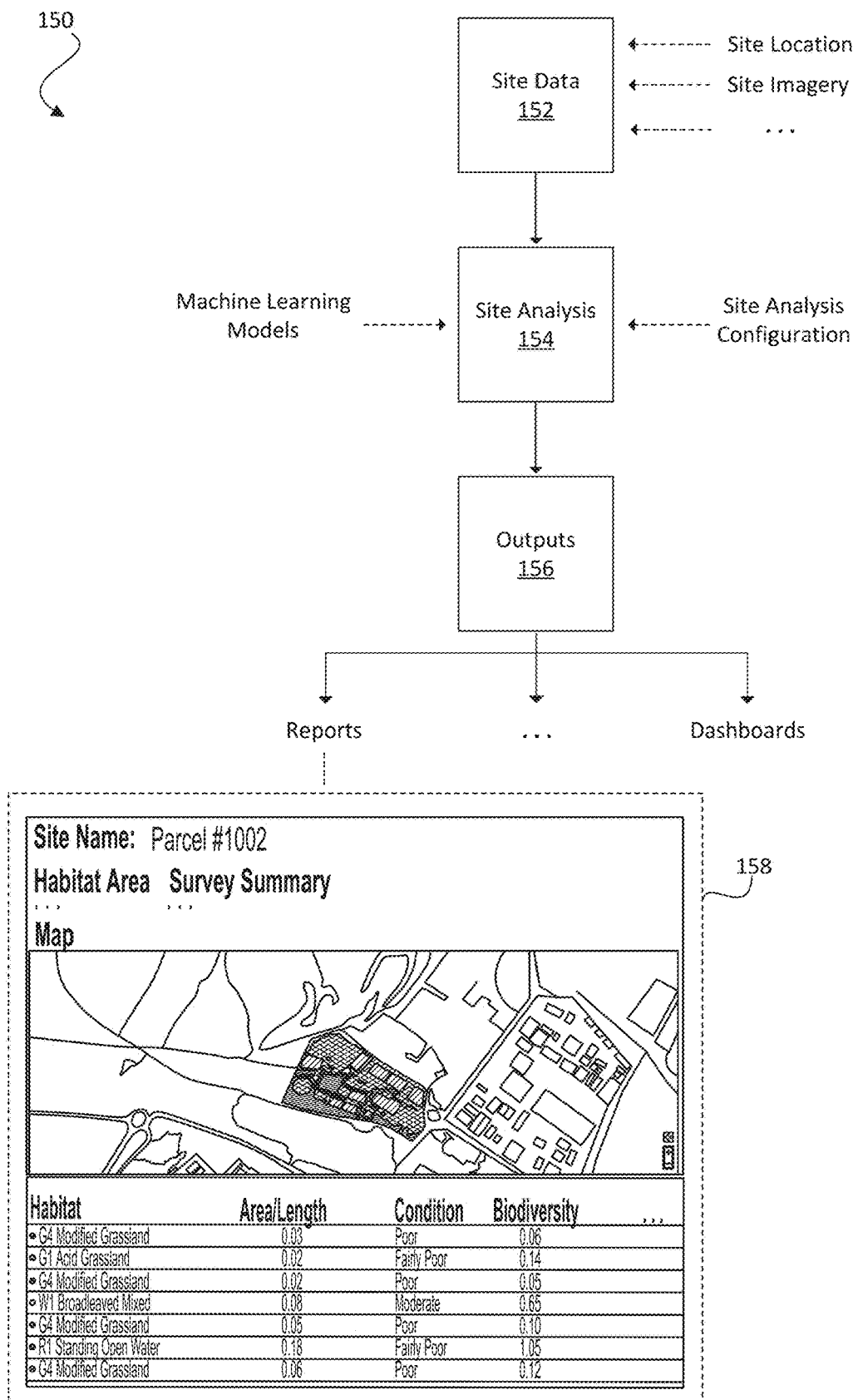
FIG. 1B depicts an example process for analyzing a parcel of land according to some embodiments.

For example, FIG. 1B depicts an example process 150 for analyzing a parcel of land, according to some embodiments. In step 152, site data for a parcel of land may be obtained. The site data may include geographical information describing a location of the parcel of land and data points (e.g., information or features related to the parcel of land. The data point may be non-image data or image data (e.g., aerial images, satellite images, digital surface model images, or the like) of the parcel of land. In various embodiments, other sources of information, such as existing survey data and maps may also be used as site data.

In step 154, the parcel of land may be analyzed. For example, the data point (e.g., image or non-image) of the parcel of land may be evaluated using machine learning models to conduct various analyses, such as a land use analysis, a land cover analysis, a tree analysis, and object detection analysis. Further, existing survey data may be leveraged to segment and label (or classify) regions within the parcel of land. For example, an existing map of water bodies may be leveraged to generate corresponding boundaries for water bodies present in the parcel of land. In various embodiments, the parcel of land may be analyzed according to a site analysis configuration that specifies the types of analyses to be conducted with respect to the parcel of land.

Once a parcel of land has been analyzed, in step 156, information describing the parcel of land may be provided, for example, in a graphical user interface (GUI). The graphical user interface may provide access to various dashboards and reports 158 that provide information describing the parcel of land, including results of any analyses conducted with respect to the parcel of land. The graphical user interface may also provide access to tools that facilitate site planning and monitoring. Many other outputs and variations are possible.

The claimed solution provides many advantages over conventional approaches. For instance, the claimed solution helps entities (e.g., landowners, regulators, or the like) accurately and efficiently evaluate any parcel of land without having to devote significant resources to manually conduct assessments. For instance, a landowner may use the claimed solution to segment habitat regions within a parcel of land based on generally available resources, such as satellite images, which may be analyzed based on machine learning models to detect and label habitats. Over time, the claimed solution may continually be applied to observe changes to the parcel of land and its habitats.

As another advantage, the claimed approach allows entities to simulate potential land conversion projects for a parcel of land and observe the effects of such projects. For example, the simulation may provide predicted metrics, such as biodiversity and carbon emissions, that may result upon completion of the land conversion projects. The predicted metrics may help determine the feasibility and practicality of a given project.

In yet another advantage, the claimed approach allows entities to efficiently monitor parcels of land for various requirements. For example, a parcel of land may be subject certain land-based rules or regulations. In this example, the claimed solution may be applied to monitor the parcel of land and its related metrics to demonstrate compliance.

Figure 2:
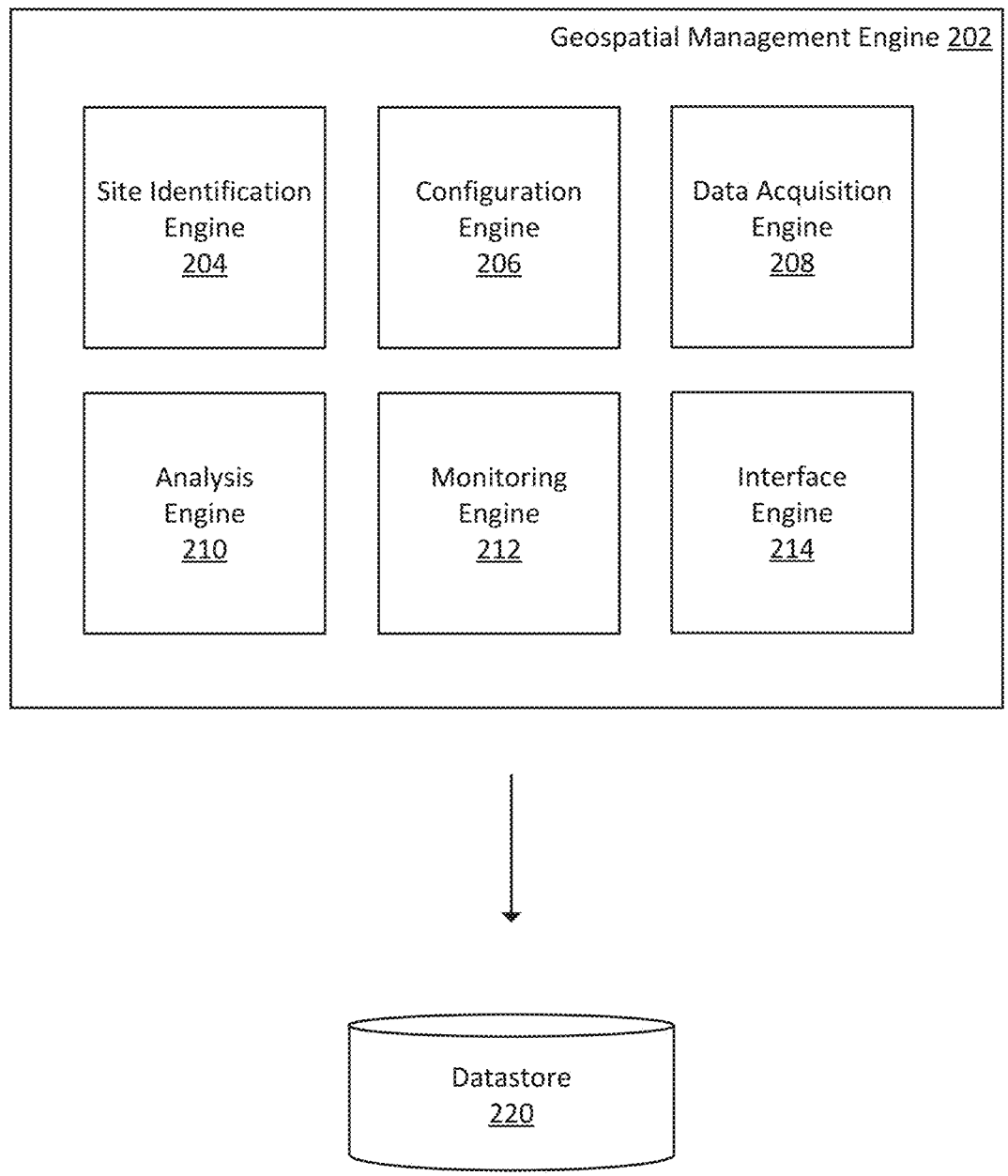
FIG. 2 depicts a block diagram of components of a geospatial management engine according to some embodiments.

FIG. 2 depicts a block diagram of components of a geospatial management engine 202 according to some embodiments. The geospatial management engine 202 may be implemented in a computer system that includes at least one processor, memory, and communication interface. The computer system can execute software, such as geospatial management software, that performs any number of functions described in relation to FIG. 2.

The geospatial management engine 202 includes a site identification engine 204, a configuration engine 206, a data acquisition engine 208, an analysis engine 210, a monitoring engine 212, and an interface engine 214. The geospatial management engine 202 can access a datastore 220. The datastore 220 may store various information for geographic regions, such as land surveys, maps, and images (e.g., aerial images, satellite images, or the like).

The site identification engine 204 may be configured to obtain or receive geolocation information identifying a geographic location to be analyzed. In some embodiments, the geographic location may be identified based on a shapefile that describes physical boundaries of the geographic location, for example, based on a set of geographic coordinates. The shapefile may be provided by an entity that is requesting various analyses be performed for the geographic location. As an example, the shapefile may include a set of latitude and longitude coordinates that bound the geographic location. In some embodiments, the shapefile may provide additional attributes that describe the geographic location including, for example, area, geometry, and types of assets present at the geographic location (e.g., farm, power plant, manufacturing plant, or the like). Many variations are possible.

Other approaches for identifying the geographic location are contemplated. For example, in some embodiments, rather than providing a shapefile, the entity may be permitted to identify the geographic location in a graphical user interface (GUI). In such embodiments, the entity may interact with the GUI to draw boundaries of the geographic location in a digital map. The drawn boundaries may be used to determine geographic coordinates associated with the geographic location. Many variations are possible.

In general, the terms geographic location, geographic region, site, area of interest, parcel of land, lot, block, or tract of land are used interchangeably, and all refer to some physical land area to be processed using the techniques described herein.

The configuration engine 206 may be configured to determine types of analyses (or assessments) to be conducted with respect to a geographic location. For example, in some embodiments, the configuration engine 206 may provide options for selecting various types of analyses that may be performed in relation to the geographic location. The options may be provided in a graphical user interface (GUI). A user interacting with the GUI may select one or more analyses to be performed for the geographic location.

Embodiments described herein support many types of analyses (or assessments), which may be selected individually or as a combination. Some example types of analyses that may be selected include: an area determination analysis, a biodiversity analysis, a carbon analysis, an air quality analysis, a flood risk analysis, a timber analysis, a food production analysis, a pollination analysis, a natural capital analysis, a monetary value analysis, a societal value analysis, a land use analysis, a land cover analysis, an object detection analysis, and a tree analysis. Many other types of analyses and variations thereof are contemplated.

In various embodiments, users may define custom analyses to be performed on their land parcels. For example, a user may define a custom analysis that measures a population of an endangered species. As another example, a user may define a custom analysis that detects algae blooms. Many variations and customizations are possible.

The data acquisition engine 208 may be configured to obtain information associated with a geographic location being analyzed. For example, based on information identifying the geographic location determined by the site identification engine 204, the data acquisition engine 208 may obtain images of the geographic location. For example, the images may be aerial images of the geographic location, satellite images of the geographic location, or digital surface model (DSM) images of the geographic location. The obtained images may be processed by the analysis engine 210 to extract various insights. In some embodiments, the data acquisition engine 209 may obtain non-image data of the geographic location and/or images of the geographic location for analysis.

The data acquisition engine 208 may obtain other types of information that can be used to analyze the geographic location. For example, the data acquisition engine 208 may obtain or access various surveys that were previously conducted for the geographic location. For example, the data acquisition engine 208 may obtain land (or ground) surveys that were previously conducted for the geographic location.

A land survey may identify geographic features, such as water bodies and boundaries, which may be referenced when analyzing and labeling the geographic location. In another example, the data acquisition engine 208 may obtain or access ordinance surveys that were previously conducted for the geographic location. An ordinance survey may assess the geographic location for regulatory compliance. Such assessments may be referenced by the analysis engine 210 when analyzing the geographic location.

The data acquisition engine 208 may obtain map data that can be used to analyze the geographic location. In some embodiments, the data acquisition engine 208 may obtain feature maps associated with the geographic location. For example, the data acquisition engine 208 may obtain a map of a road network in the geographic location. As an example, the map may be used as reference when segmenting and labeling habitats in the geographic location.

In another example, the data acquisition engine 208 may obtain a map of structures (e.g., houses, buildings, barns, sheds, or the like) in the geographic location. As an example, the map may be used as reference when classifying regions within the geographic location.

In yet another example, the data acquisition engine 208 may obtain a map that provides normalized difference vegetation index (NDVI) measurements for the geographic location. As an example, the map may be used as reference for ground and habitat classifications. Many other types of maps may be retrieved and used as reference.

In some embodiments, the data acquisition engine 208 may obtain land use maps associated with the geographic location. A land use map may identify various regions within the geographic location and their primary uses (e.g., agricultural, residential, industrial, mining, recreational, or the like). For example, a region used for crops may be categorized as agricultural while a region used for housing may be categorized as residential. As an example, a land use map may be provided in a graphical user interface as a visual overlay in an image of the geographic location. In another example, the land use map may be used as reference when determining carbon metrics for the geographic location.

In some embodiments, the data acquisition engine 208 may obtain land cover maps associated with the geographic location. A land cover map may identify various regions in the geographic location and their corresponding habitats. As an example, the land cover map may be used as reference when segmenting and labeling habitats in an image of the geographic location.

The analysis engine 210 may be configured to perform various analyses in relation to the geographic location. The analysis engine 210 may perform such analyses based on images of the geographic location, data points (e.g., non-images) of the geographic location (e.g., provided by third parties), and/or information describing the geographic location, as obtained by the data acquisition engine 208. In various embodiments, the analysis engine 210 may employ machine learning models to obtain various insights for the geographic location, for example, based on the images of the geographic location and/or the information describing the geographic location.

For example, the analysis engine 210 may perform an area analysis to measure an area of the geographic location or a region within the geographic location. For example, the area of the geographic location may be measured based on a polygon shape that defines the boundaries of the geographic location. For example, the polygon shape may be drawn by a user in a graphical user interface (GUI) in relation to an aerial or satellite image of the geographic location (or in relation to data points associated with the geographic location such as coordinates or the like). In another example, the polygon shape may be determined automatically based on the location information determined by the site identification engine 204.

According to some embodiments, the analysis engine 210 may perform a biodiversity analysis to measure a level of biodiversity associated with the geographic location. For example, the analysis engine 210 may determine biodiversity based on machine learning models trained to detect various objects (e.g., plants, animals, or the like) in images of the geographic location. The machine learning models may provide information, such as types of objects identified and corresponding populations or concentrations. Such information may be used to determine a level of biodiversity associated with the geographic location. Many variations and customizations are possible.

In some embodiments, the analysis engine 210 may perform a carbon analysis to determine carbon-related metrics (e.g., carbon emissions, credits, offsets, stock, or the like). For example, the analysis engine 210 may determine a carbon footprint for the geographic location based on an amount of vegetation detected by a machine learning model in images of the geographic location. Many variations and customizations are possible.

In some embodiments, the analysis engine 210 may perform an air quality analysis to determine a level of air quality associated with the geographic location. For example, the analysis engine 210 may determine air quality for the geographic location based on publicly available air quality data. The air quality may be measured over time to determine changes to air quality and pollution over time. Many variations and customizations are possible.

In some embodiments, the analysis engine 210 may perform a flood analysis to determine a risk of flood occurring at the geographic location. For example, the analysis engine 210 may determine flood risk for the geographic location based on publicly available flood maps. Many variations are possible. In some embodiments, the analysis engine 210 may determine flood risk based on water levels detected by a machine learning model in images of the geographic location. Many variations and customizations are possible.

In some embodiments, the analysis engine 210 may perform a timber analysis to determine an amount of timber growing at the geographic location. For example, the analysis engine 210 may detect regions within the geographic location that correspond to timber based on a machine learning model that detects timber in images of the geographic location. The detected timber may be bounded by one or more polygons. An area measurement for the detected timber may be determined and used to estimate timber concentrations. In various embodiments, digital surface model (DSM) images of the geographic location may be evaluated to estimate tree counts, heights, and biomass. Many variations and customizations are possible.

In some embodiments, the analysis engine 210 may perform a food production analysis to determine an amount of food that is being produced at the geographic location. For example, the analysis engine 210 may detect regions associated with food production (e.g., agricultural regions) within the geographic location based on a machine learning model that classifies land types in images of the geographic location. The detected land may be bounded by one or more polygons. An area measurement for the detected land may be determined and used to estimate a level of food production associated with the geographic location. The estimated level of food production may also be determined based on existing survey and map data identifying the types of food being produced at the geographic location. Many variations and customizations are possible.

In some embodiments, the analysis engine 210 may perform a pollination analysis to determine an amount of pollination associated with the geographic location. For example, the pollination analysis may provide a level of pollination associated with the geographic location as determined based on publicly available pollination maps and data. Many variations and customizations are possible.

In some embodiments, the analysis engine 210 may perform a natural capital analysis to determine a natural capital value for the geographic location. The natural capital value may be determined based on renewable and non-renewable resources (e.g., plants, animals, air, water, soils, minerals) that are available within the geographic location. The resources available and their respective amounts may be determined based on a machine learning model that is trained to detect such resources in images of the geographic location. Many variations and customizations are possible.

In some embodiments, the analysis engine 210 may perform a monetary value analysis to determine a monetary value for the geographic location. The monetary value may be determined according to various factors. For example, the monetary value may be determined based in part on sales data for nearby parcels of land. Various site metrics may also influence the monetary value. For example, a site associated with a high level of biodiversity and low level of carbon emissions may be assigned a higher monetary value while a site associated with a low level of biodiversity and high level of carbon emissions may be assigned a lower monetary value. Many variations and customizations are possible.

In some embodiments, the analysis engine 210 may perform a societal value analysis to determine a societal value metric for the geographic location. The societal value metric may measure an amount of societal benefit that is provided by the geographic location. For example, the analysis engine 210 may analyze images of the geographic location (and/or non-image data) based on machine learning models to detect regions allocated for food production or recreation. In this example, the societal value metric for the geographic location may be determined based on the detected regions and their relative areas. Many variations and customizations are possible.

In some embodiments, the analysis engine 210 may perform a land use analysis to determine how the geographic location is being used. For instance, the land use analysis may indicate whether the geographic location is allocated for agricultural, residential, industrial, mining, and/or recreational use. The land use analysis may be determined by machine learning models that analyze images of the geographic location and segment regions by use. Further, the land use analysis determined based on the machine learning models may be validated based on existing land use data for the geographic location that serves as a reference. Any discrepancy between the land use analysis and the existing land use data may be flagged for human review. Many variations and customizations are possible.

In some embodiments, the analysis engine 210 may perform a land cover analysis to determine various habitats represented in the geographic location. In such embodiments, a machine learning model trained to segment an image of the geographic location into habitats may be deployed to label (or classify) habitat regions within the geographic location. Further, the land cover analysis determined based on the machine learning model may be validated based on existing land cover data for the geographic location which serves as a reference. Any discrepancy between the land cover analysis and the existing land cover data may be flagged for human review. Many variations and customizations are possible.

In some embodiments, the analysis engine 210 may perform an object detection analysis to determine various objects (e.g., humans, animals, or the like) present at the geographic location. For example, the analysis engine 210 may apply machine learning models that are trained to detect objects in images of the geographic location. In this example, object-related information, such as object types and respective populations, may be determined based on outputs from the machine learning models. For example, a user may request a custom analysis that measures a population of an endangered species. In this example, the analysis engine 210 may process images of the geographic location using a machine learning model that is trained to detect the endangered species. Many variations and customizations are possible.

In some embodiments, the analysis engine 210 may perform a tree analysis for the geographic location. For example, the analysis engine 210 may apply machine learning models that are trained to detect trees in images of the geographic location. In this example, tree-related information, such as tree counts and respective heights, may be determined based on outputs from the machine learning models. In various embodiments, digital surface model (DSM) images, which provide point-level elevation measurements, may be used to determine tree metrics. Many variations and customizations are possible.

In some embodiments, the analysis engine 210 may perform super resolution techniques to enhance the resolution of images of the geographic location. For example, the analysis engine 210 may determine higher resolution imagery of the geographic location based on lower resolution images of the geographic location. As an example, the analysis engine 210 may apply machine learning models that are capable of upscaling lower resolution images of the geographic location. The enhanced images of the geographic location may be analyzed using any of the techniques described herein to gain further and more accurate insights. Many variations and customizations are possible.

In some embodiments, the analysis engine 210 may perform simulations to determine potential changes to the geographic location that may result from planned land conversions. For example, the analysis engine 210 may predict changes to site metrics, such as biodiversity and carbon stock, that may result from the addition or removal of certain land features (e.g., habitats, water bodies, new construction, or the like). The predictions may be determined based in part on the type of land conversion being contemplated and the relative size of the area that is subject to the land conversion. Many variations and customizations are possible.

In some embodiments, the analysis engine 210 may perform a compliance analysis to determine whether the geographic location is in compliance with various legal or binding requirements (e.g., regulations, ordinances, conditions, or the like). For example, the geographic location may be subject to land allocation requirements that require a certain amount of land to be devoted to various habitats. In this example, images of the geographic location may be analyzed over time to determine whether the land allocation requirements are being satisfied and to what extent. For example, machine learning models may be applied to images of the geographic location to detect habitats and related changes over time. Many variations and customizations are possible.

The monitoring engine 212 may be configured to monitor the geographic location for various purposes. For example, the monitoring engine 212 may monitor the geographic location for changes to determine land conversion progress. In another example, the monitoring engine 212 may monitor the geographic location for changes to ensure compliance requirements are being satisfied. In various embodiments, the monitoring engine 212 may be configured to monitor the geographic location at various intervals (e.g., daily, monthly, annually, or the like). In such embodiments, at each time interval, the monitoring engine 212 may obtain images of the geographic location and other information (e.g., surveys, maps, or the like). The obtained images and information may be analyzed by the analysis engine 210, as described above. The results of the analysis may be stored and made accessible in interfaces provided by the interface engine 214. The results may be used to track and visually plot relevant changes to the geographic location over time.

The interface engine 214 may be configured to provide graphical user interfaces (GUIs) that may present (or display) information describing the geographic location, including results of any analyses that were performed in relation to the geographic location by the analysis engine 210. In various embodiments, the interface engine 214 may provide access to various dashboards, reports, and planning tools, as illustrated in the examples of FIGS. 3A-3I.

Figure 3A:
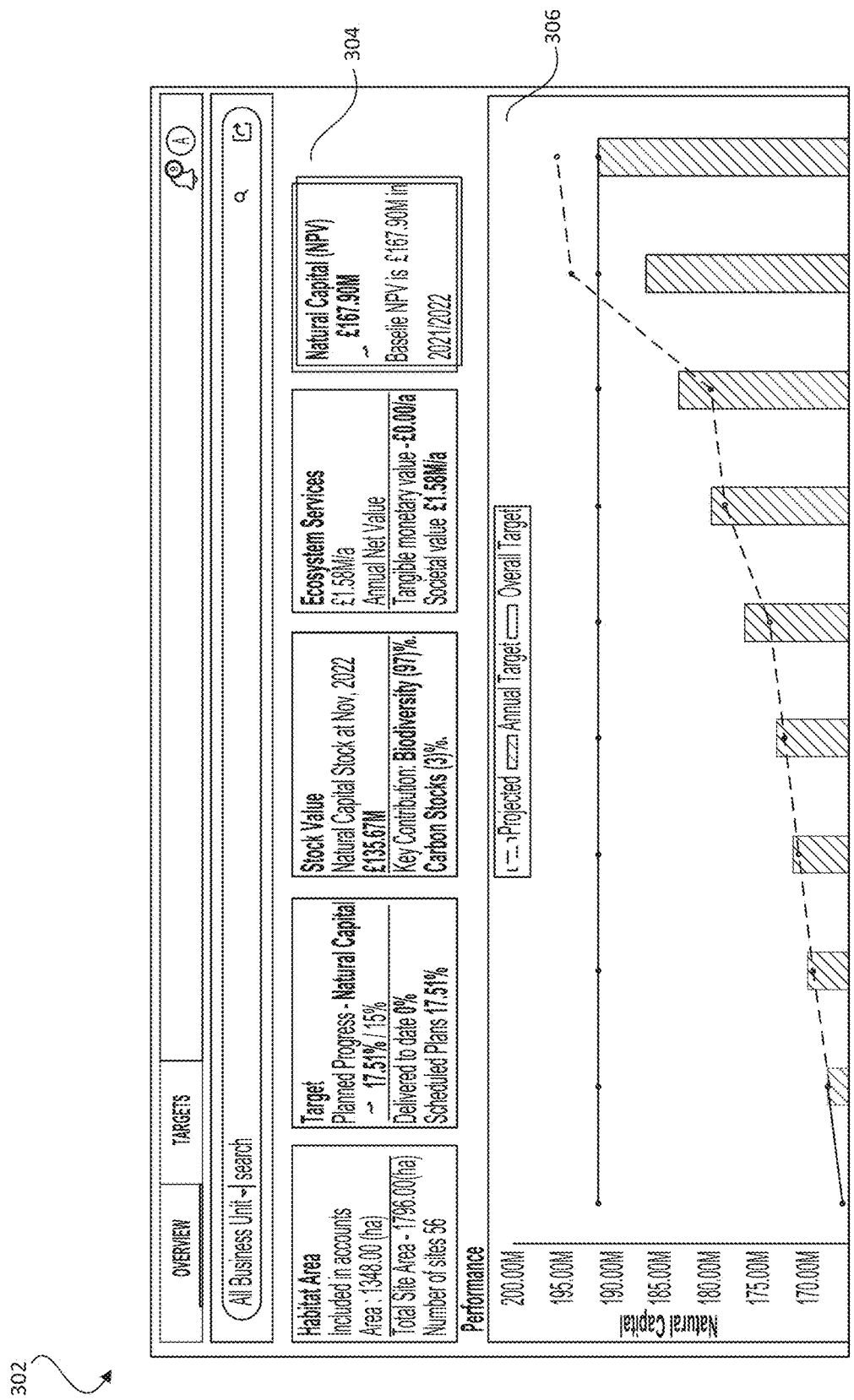

For example, FIG. 3A illustrates an example interface 302 of a dashboard that may be provided by the interface engine 214. The interface 302 provides various information determined for the geographic location based on analyses performed by the analysis engine 210. For example, the interface 302 may provide site information 304 relating to habitats associated with the geographic location, status on planned land conversions, natural capital value, ecosystem values (e.g., monetary value, societal value, or the like), and changes to natural capital value over time. The interface 302 may also provide visualizations (e.g., graphs, plots, or the like) that show changes to various site metrics over time. In the example of FIG. 3A, the interface 302 provides a visualization 306 of changes to a natural capital value associated with the geographic location as determined based on the monitoring engine 212 over a period of time.

FIG. 3B illustrates another example dashboard interface 310 that provides access to various site metrics. The interface 310 may provide access to various metrics 312 (e.g., air quality, biodiversity, carbon, recreation, food production, natural capital, timber, or the like) for one or multiple geographic locations associated with an entity (e.g., a landowner). A drop-down menu may be used to select different metrics to be presented within the interface 310. In the example of FIG. 3B, the interface 310 provides biodiversity metrics for a number of sites associated with the entity.

For each site, the interface 310 may provide detailed information, such as an area of the site, biodiversity, biodiversity per hectare, an opportunity score reflecting potential opportunities for improving biodiversity, and a change in biodiversity in relation to a baseline biodiversity value. In various embodiments, opportunity scoring helps with relative prioritization. For example, if there are 100 sites and there is only manpower to work on five sites, opportunity scores may assist (e.g., by ranking based on opportunity scores) to select the most preferable sites for the work. The dashboard interface 310 of FIG. 3B may provide opportunity scores as integers of score or site rank values. In various embodiments, different clients may have different rules and policies to adjust the dashboard based on their configuration(s).

Many variations are possible. In various embodiments, a user interacting with the interface 310 may select options 314 to access more detailed site information.

Figure 3C:
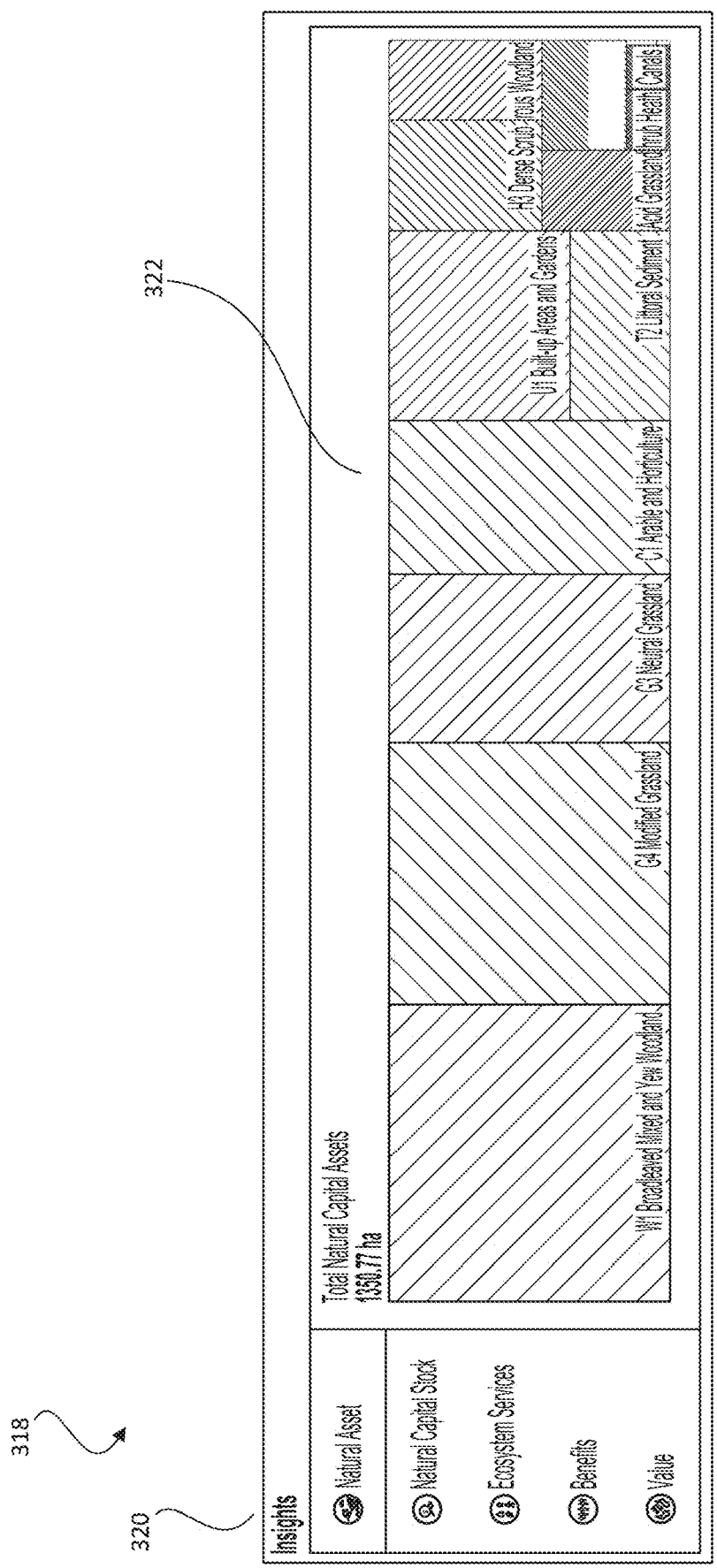

FIG. 3C illustrates another example dashboard interface 318 that provides access to various insights that were determined based on analyses performed by the analysis engine 210. For example, the interface 318 may provide insights 320 related to natural assets, natural capital stock, ecosystem services, benefits, and value. In the example of FIG. 3C, the interface 318 provides a visual distribution 322 of total natural capital assets (e.g., woodland, grassland, arable land, swampland, or the like) associated with a site. The visual distribution 322 may identify individual natural capital assets associated with the site and a relative land area associated with each natural capital asset. The visual distribution 322 may help visualize the different natural capital assets and their relative amounts. For instance, each natural capital asset associated with the site may be shown in a section of the visual distribution 322 in a distinct color or pattern. The size of the section may reflect the land area associated with the natural capital asset. Many variations are possible.

Figure 3D:
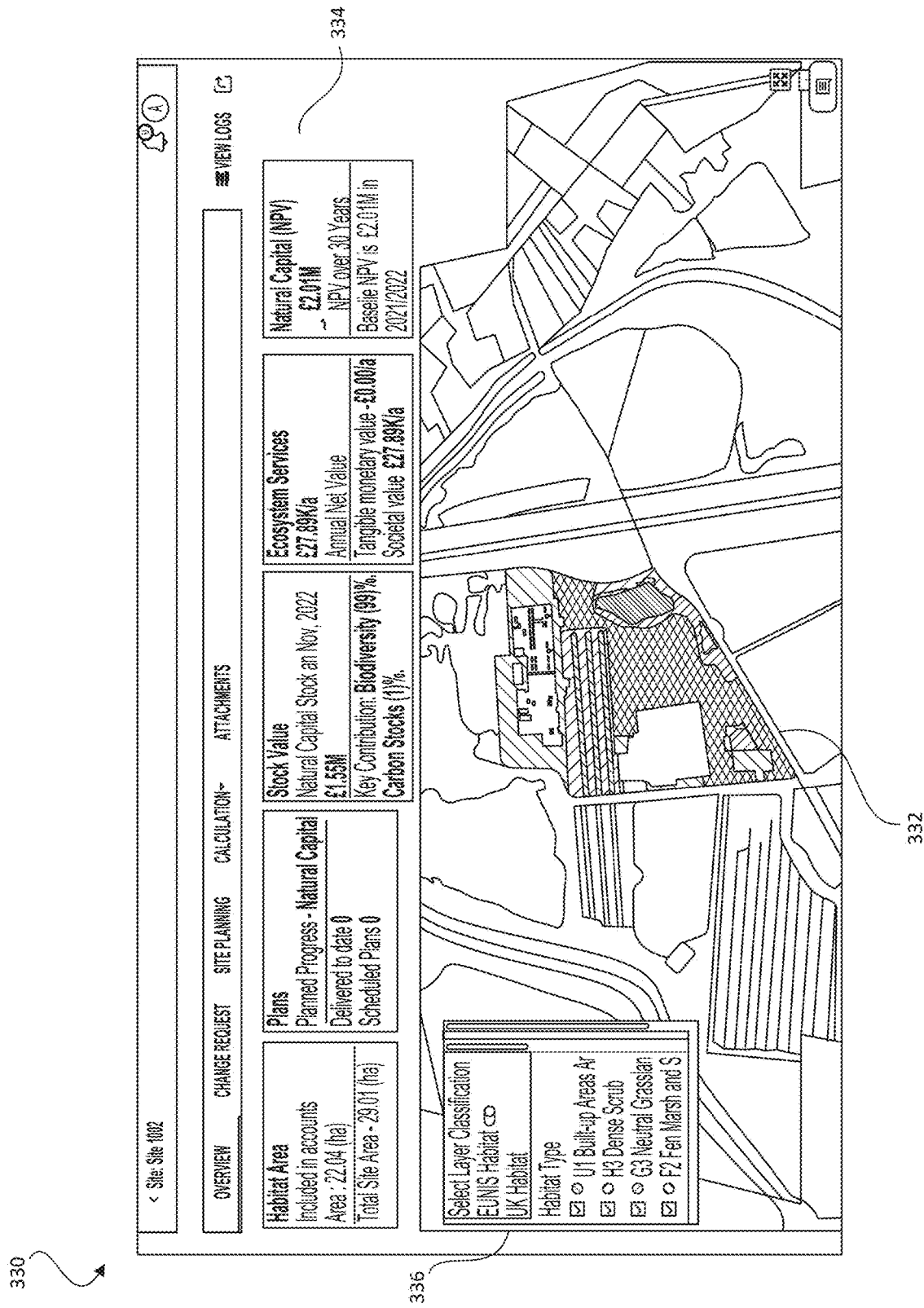

In various embodiments, the interface engine 214 may be configured to provide GUIs that enable entities to manage their sites. For example, FIG. 3D illustrates an example site management interface 330 for managing a given site. The interface 330 may provide a map 332 of the site. The map 332 may visually segment regions in the site by habitat. For example, each region associated with a particular habitat may be presented in a distinct color or pattern. A user may interact with the interface 330 to reposition the map 332 or adjust a zoom level of the map 332, for example.

The interface 330 may also provide various metrics 334 associated with the site or a selected habitat region. In the example of FIG. 3D, the interface 330 provides metrics 334, such as habitat area, status on site plans, natural capital value, ecosystem values (e.g., monetary value, societal value, or the like), and changes to natural capital value over time. Many variations are possible. In various embodiments, the interface 330 provides options 336 to select or remove certain habitat types from being shown in the map 332. Further, the interface 330 may also provide options that allow a user interacting with the interface 330 to modify any of the habitats associated with the site. For example, the user may modify a habitat type associated with a region or modify boundaries of the region.

Figure 3E:
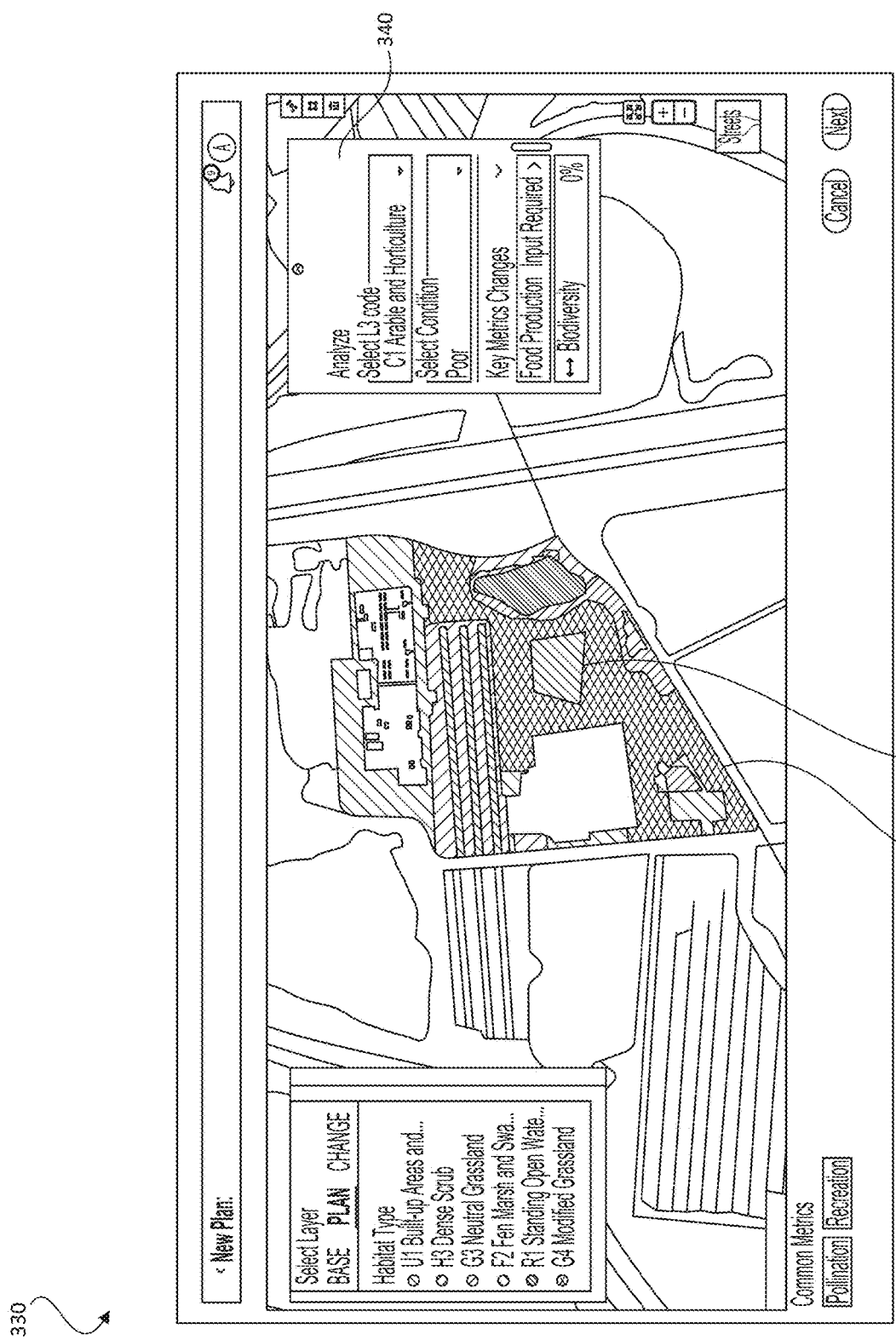

The interface 330 may provide options that enable entities to plan changes (or conversions) to their sites. For example, FIG. 3E illustrates an example plan contemplated for the site. In this example, the plan involves a conversion of a region 338 of the site to a different habitat. In various embodiments, the region 338 designated for conversion may be identified by a user interacting with the interface 330. For example, the user may interact with the interface 330 to draw a polygon that defines boundaries of the region to be converted. Once the polygon is created, various attributes for the selected region 338 may be specified in a menu 340. For example, the user may specify a habitat to which the region will be converted and an intended condition (e.g., poor, moderate, or the like) for that region. The user may also specify changes to key metrics that are required as a result of the conversion.

Figure 3F:
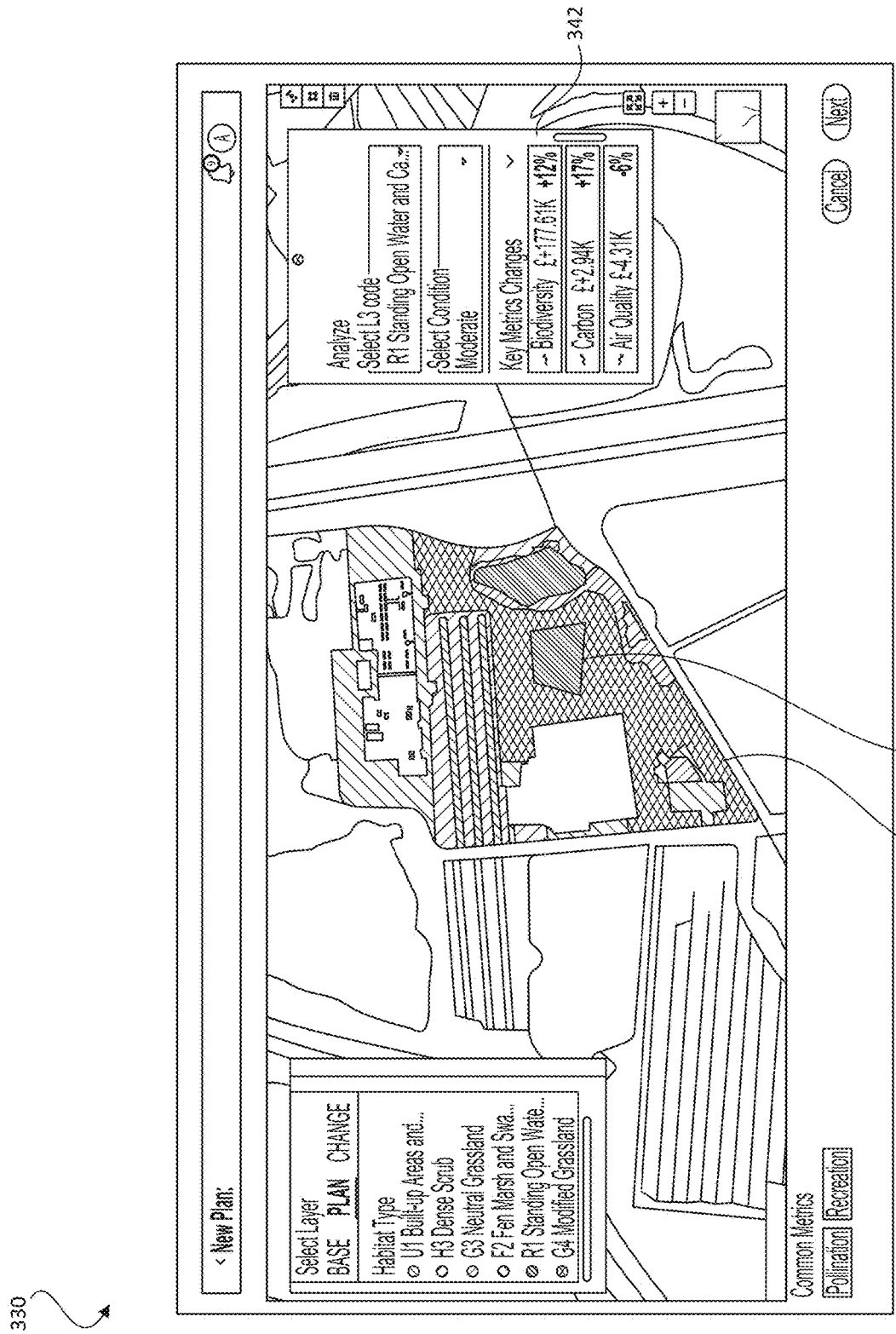

Based on the selected region and specified attributes, a simulation of the planned conversion may be performed by the analysis engine 210 to determine changes to site metrics that may result. The changes may be determined based on the type of habitat planned for the region 338 and a total area determined for the region 338. For example, FIG. 3F illustrates expected changes 342 to metrics that may result from the planned conversion. In this example, the changes 342 indicate that, due to the planned conversion, site biodiversity is expected to increase by 12 percent, carbon stock is expected to increase by 17 percent, and air quality is expected to decrease by 6 percent. Such insights may help inform whether the planned conversion is feasible or desirable.

Figure 3G:
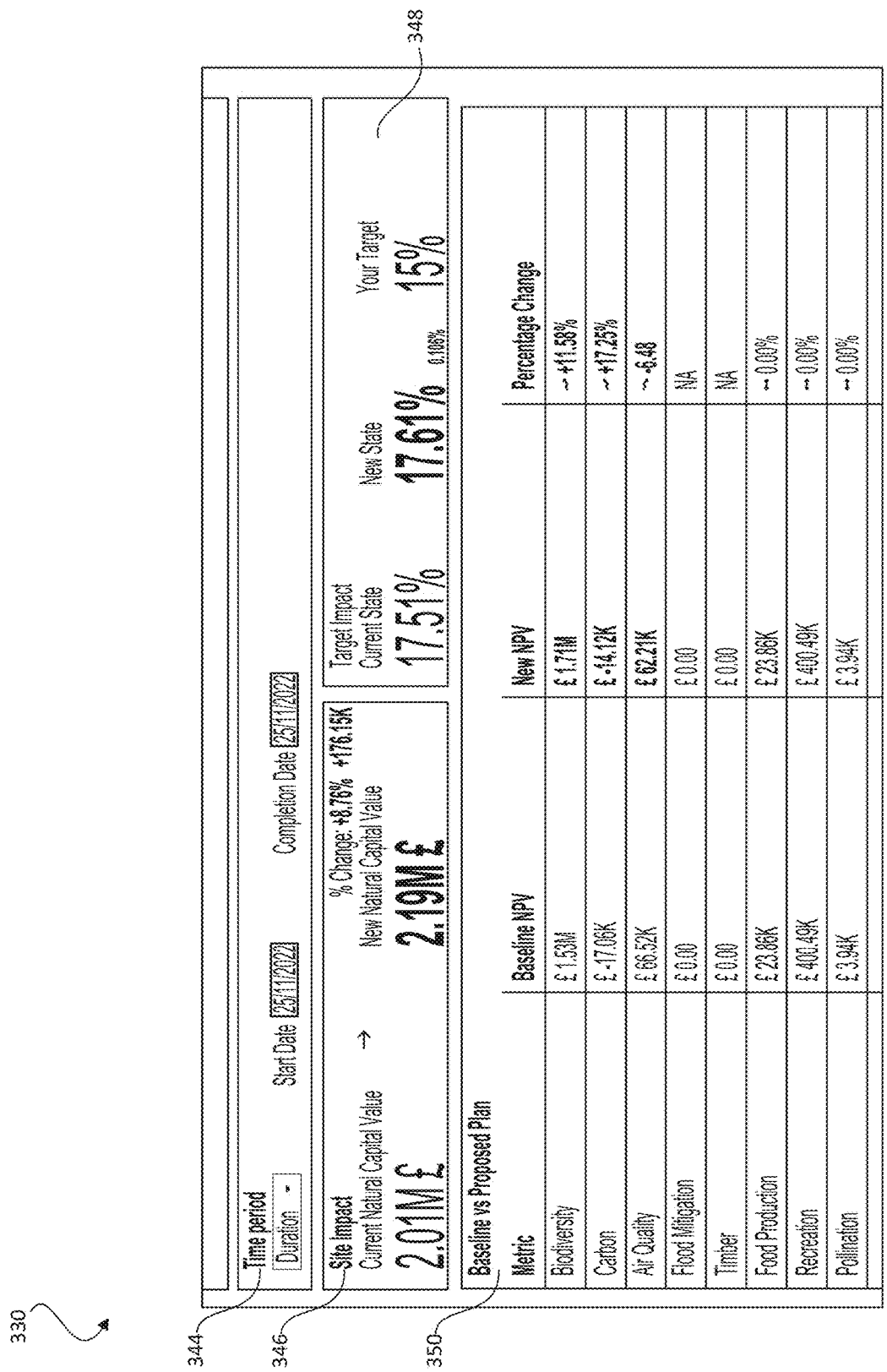
Figure 31:
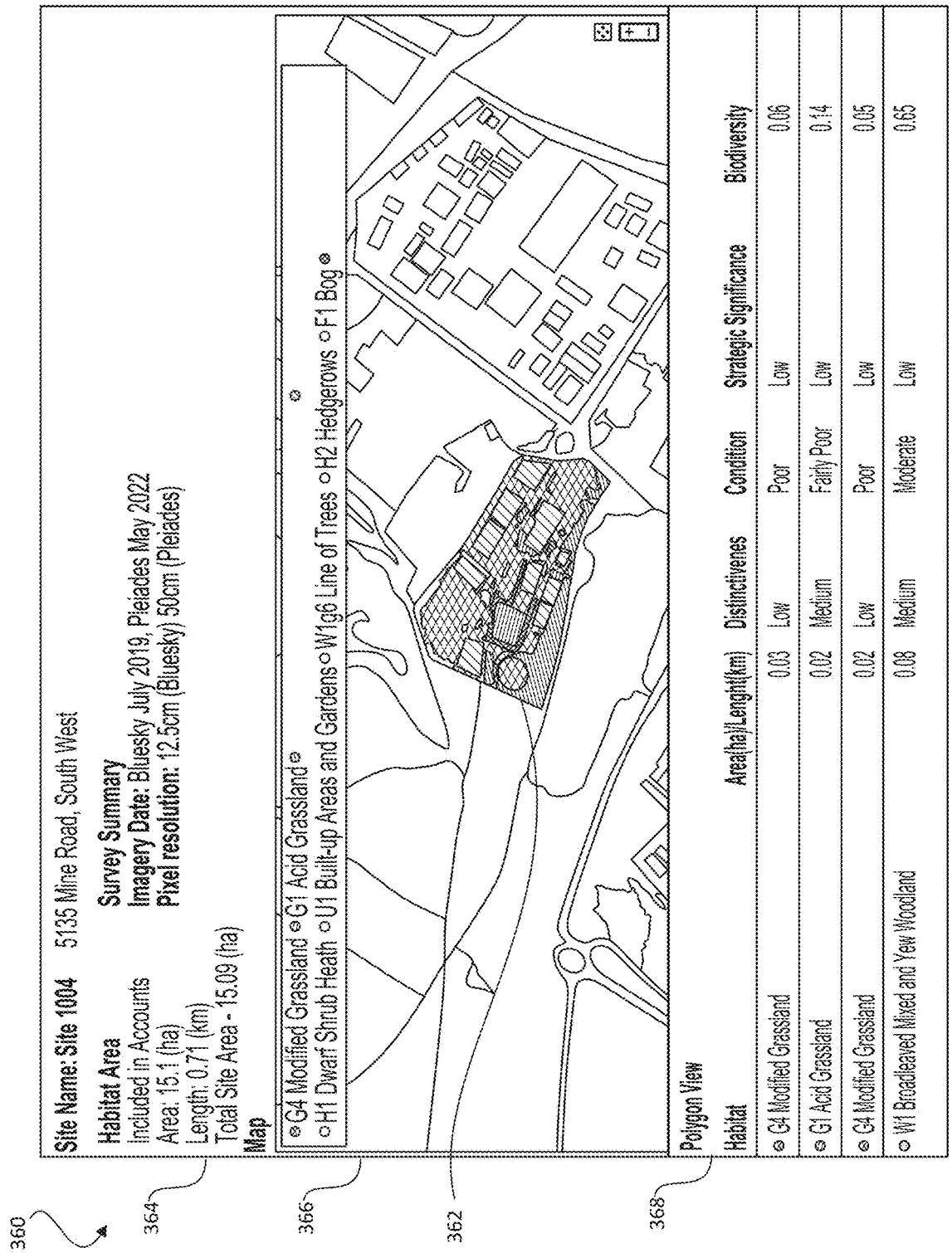

In various embodiments, additional details relating to the expected changes 342 may be accessed within the interface 330. For example, FIG. 3G illustrates a summary of expected changes due to the planned conversion over some period of time 344. The interface 330 may provide impact assessments, such as site impact 346 in terms of changes to natural capital value. In another example, the interface 330 may provide a target impact 348 that measures changes to metrics due to the planned conversion. The interface 330 may also provide a list of metrics 350 associated with the site, and corresponding baseline net present values (NPVs), new NPVs resulting from the conversion, and percentage changes between baseline and new NPVs. Some examples of the types of metrics that may be accessible include biodiversity, carbon, air quality, flood mitigation, timber, food production, recreation, and pollination. Many variations are possible.

In various embodiments, the interface engine 214 may be configured to provide a site planning interface 352 that provides an overview of various sites 354 undergoing land conversions, as illustrated in FIG. 3H. The site planning interface 352 may provide aggregated site details 356, such as area under planning (e.g., in hectares) as well as pre-intervention (or pre-conversion) and post-intervention (or post-conversion) metrics. In the example of FIG. 3H, the interface 352 provides a pre-intervention biodiversity value, a post-intervention biodiversity value, a change in biodiversity in terms of units and percentage, and a total financial cost associated with the change. Many variations are possible. For each site, the interface 352 may provide plan details 358, such as plan name, creation date, approval date, start date, end date, budget, plan manager, site name, and plan status (e.g., draft, pending approval, approved, rejected, or the like). For example, the site planning interface 352 may be accessed by a landowner seeking to manage multiple site conversions. In another example, the site planning interface 352 may be accessed by a regulator (or auditor) to check on the status of a given site conversion and determine whether compliance requirements are being satisfied. In general, interfaces made available to third parties, such as regulators, may be provided with limited read-only functionality. Such reduced access may still allow the third parties to observe and monitor geographic locations, for example, for compliance purposes.

The interface engine 214 may also be configured to provide access to site reports, as illustrated in the example of FIG. 3I. FIG. 3I illustrates an example report interface 360 determined for a site 362. For example, the report may be determined based on various analyses performed by the analysis engine 210. The interface 360 may provide various site details 364, such as habitat area. In some embodiments, the interface 360 may provide details about resources used to analyze the site 362. For example, the interface 360 may identify site imagery (e.g., satellite images, aerial images, or the like) used to analyze the site including respective timestamps and pixel resolution associated with the imagery. In some embodiments, the interface 360 may identify resources that were used to validate results of various analyses, such as certain maps and surveys.

The interface 360 may also provide a map 366 of the site 362, including any habitats that were identified within the site. Each habitat may be represented in a distinct color or pattern. Further, the interface 360 may provide habitat details 368 for each habitat identified in the site 362. To facilitate review, the habitat details for a given habitat may be associated with the same distinct color or pattern used to distinguish the habitat in the map 366. For example, habitat details 368 provided for a given habitat may include habitat area, distinctiveness, condition, strategic significance, and biodiversity. Other types of details may be provided and, of course, many variations are possible.

Figure 4:
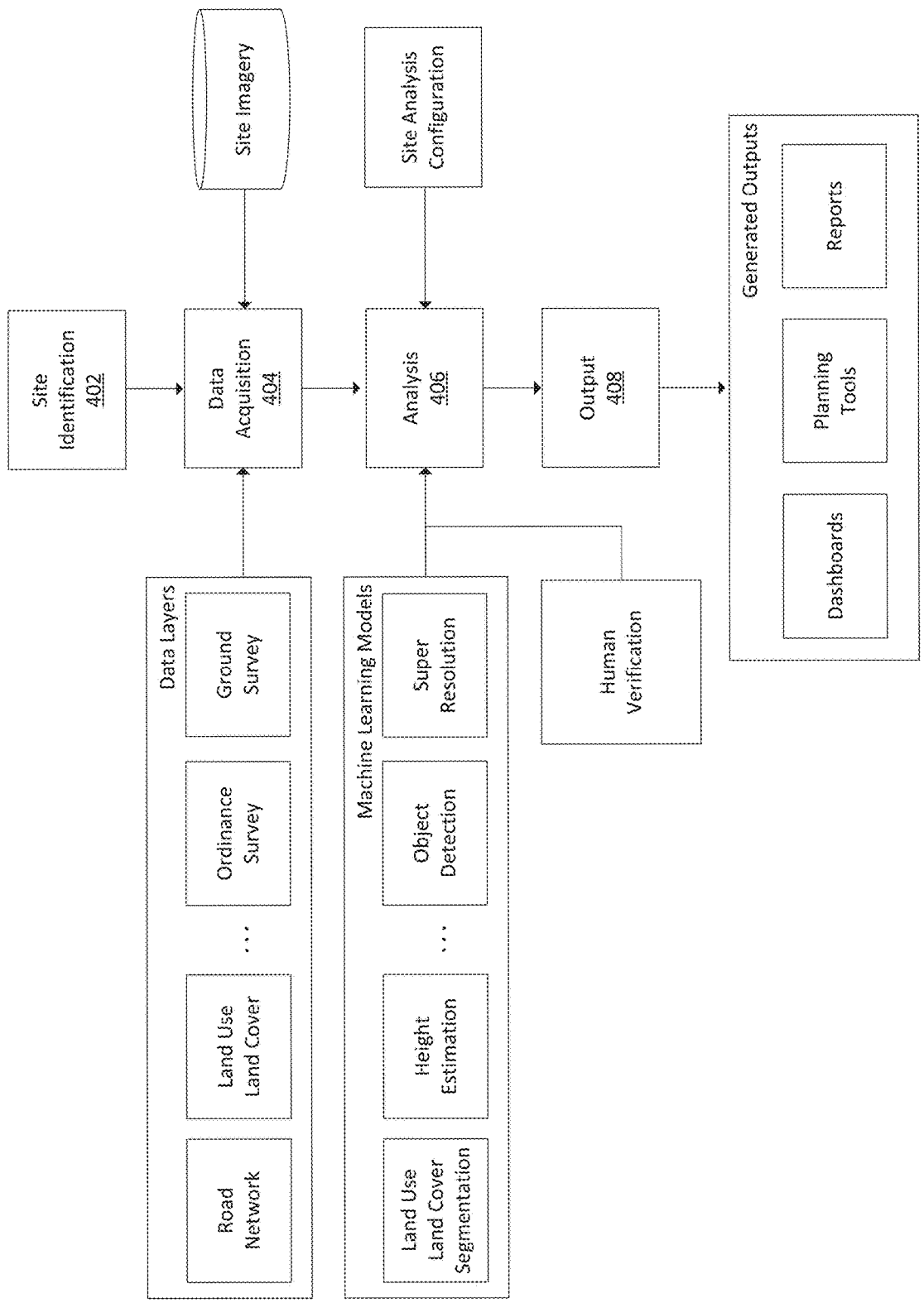
FIG. 4 illustrates an example process for analyzing land according to some embodiments.

FIG. 4 illustrates an example process for analyzing a site.

In step 402, information identifying the site may be obtained or received, as described above in relation to the site identification engine 204 of FIG. 2.

In step 404, information associated with the site may be obtained, as described above in relation to the data acquisition engine 208. The obtained data may include images (e.g., optical images, digital surface model images, or the like) and/or data points of the site that may be analyzed for various insights. The obtained data may also include data layers, such as road network maps, structure maps, land use data, land cover data, ordinance surveys, and ground surveys, for example.

In step 406, various analyses may be performed for the identified site, as described above in relation to the analysis engine 210. The analyses may be performed according to a site analysis configuration specified for the site, as described above in relation to the configuration engine 206. The site may be analyzed based on machine learning models which may process site images to provide various insights in conjunction with the obtained data layers. In various embodiments, a human-in-the-loop may be deployed to evaluate outputs from machine learning models, such has habitat labels, for completeness and accuracy.

In step 408, outputs from the analyses performed for the identified site may be provided, as described above in relation to the interface engine 214. For example, the outputs may be provided for presentation in various graphical user interfaces (GUIs) that provide access to dashboards, planning tools, and reports. In some embodiments, the interface engine 214 may allow a user to utilize tools for manual editing and/or drawing.

In various embodiments, the geospatial management engine 202 may optionally collect the information for the analysis (e.g., information acquired by the data acquisition engine 208 and analysis performed by the analysis engine 210) and store the information in the datastore 220. The interface engine 214 may optionally provide that information, records, and/or reports to allow users to document materials received, analysis performed, configurations and the like. This information may assist in future training, confirmation of the process, validation of the approach, and/or compliance with regulations or audits. In some embodiments, the geospatial management engine 202 may optionally allow users to upload information, documents (e.g., a contract for the plan), or the like. The uploaded information may optionally assist with centralizing information associated with the plan for ease of review and organization.

Figure 5A:
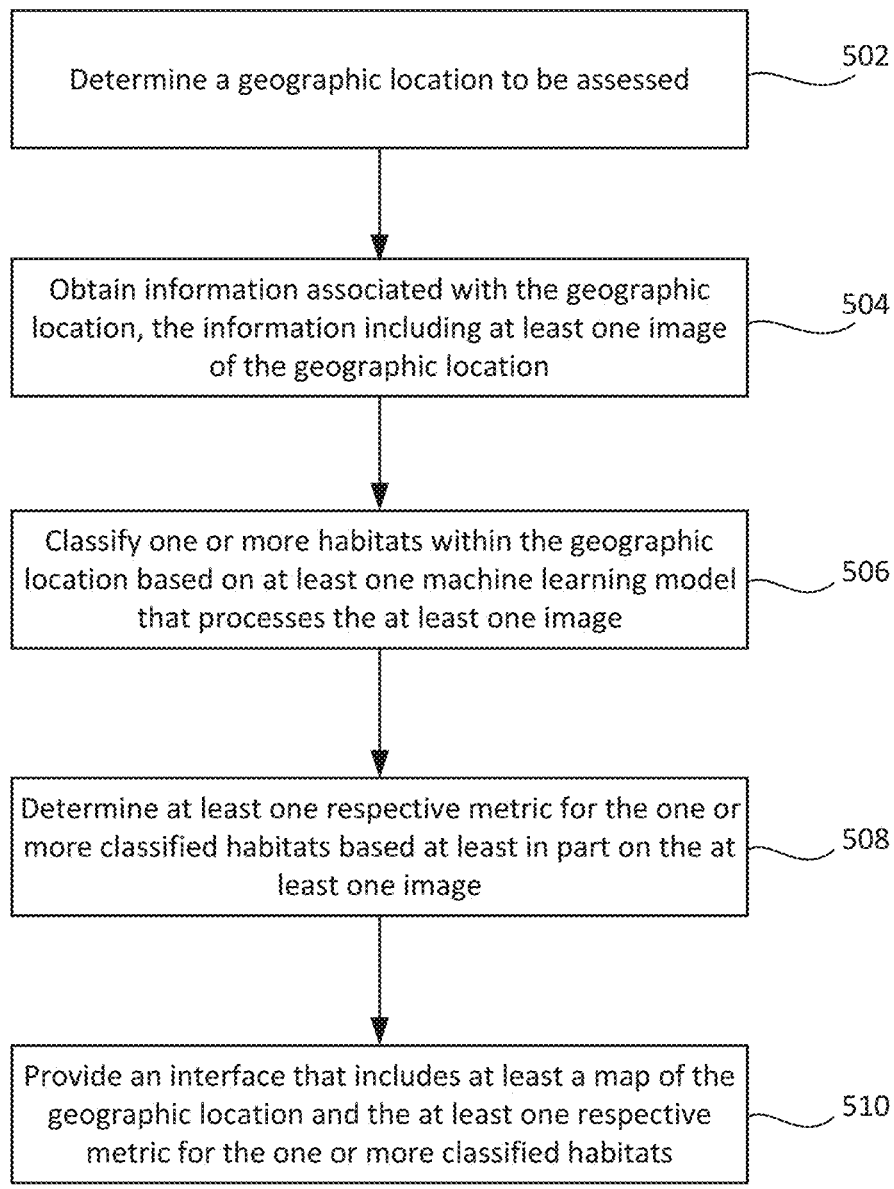
FIG. 5A illustrates an example process for determining habitats in a geographic location according to some embodiments.

FIG. 5A illustrates an example process for determining habitats in a geographic location according to some embodiments. In step 502, a geographic location to be assessed is determined. In step 504, information associated with the geographic location is obtained. The information may include at least one data point of the geographic location. The data point may be an image of the geographic location or non-image data associated with the geographic location. In step 506, one or more habitats within the geographic location are classified based on at least one machine learning model. The machine learning model may process the at least one data point of the geographic location to determine the habitats. In step 508, at least one respective metric for the one or more classified habitats is determined based at least in part on the at least one data point of the geographic location. In step 510, an interface that includes at least a map of the geographic location and the at least one respective metric for the one or more classified habitats is provided. The one or more classified habitats may be visually segmented within the map in the interface by habitat type. Many variations are possible, as described herein.

Figure 5B:
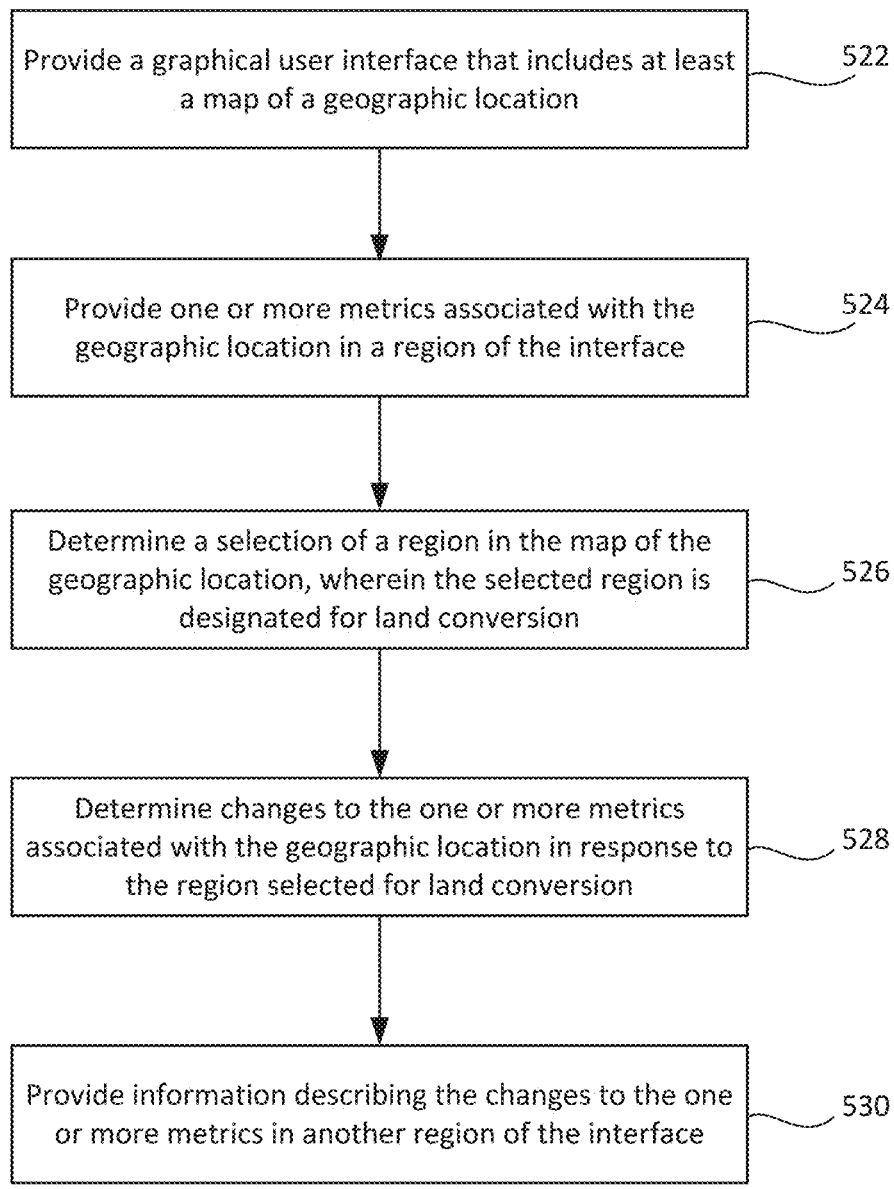
FIG. 5B illustrates an example process for planning a land conversion in a geographic location according to some embodiments.

FIG. 5B illustrates an example process for planning a land conversion in a geographic location according to some embodiments. In step 522, a graphical user interface that includes at least a map of a geographic location is provided. In step 524, one or more metrics associated with the geographic location are provided in a region of the interface. At least one metric is determined based on an data point (e.g., image) of the geographic location that is processed by a machine learning model. In step 526, a selection of a region in the map of the geographic location is determined. The selected region may be designated for land conversion. In step 528, changes to the one or more metrics associated with the geographic location are determined in response to the region selected for land conversion. In step 530, information describing the changes to the one or more metrics is provided in another region of the interface. Many variations are possible, as described herein.

Figure 6:
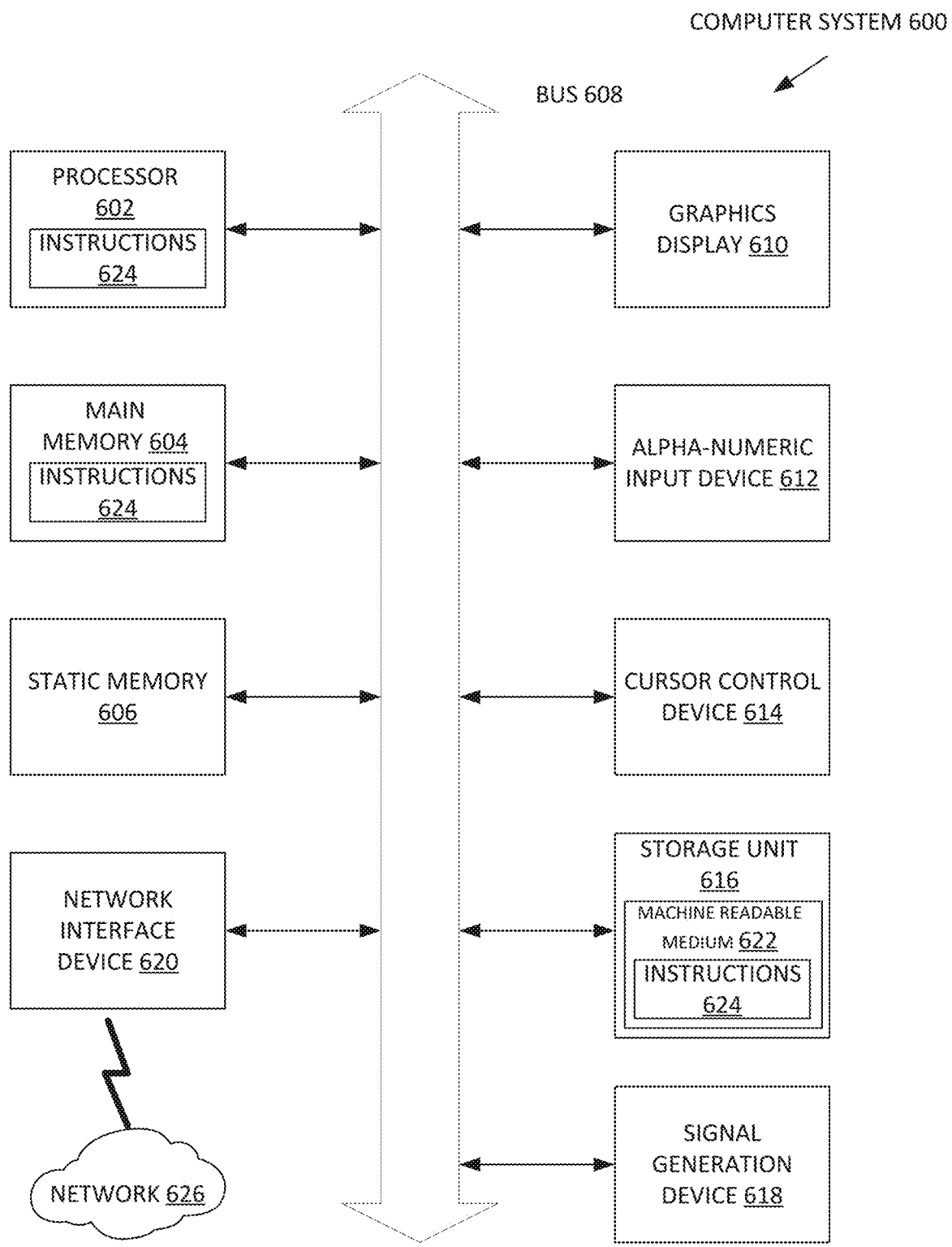
FIG. 6 is a block diagram illustrating a computing device in one example.

FIG. 6 is a block diagram illustrating a digital device in one example. The digital device may read instructions from a machine-readable medium and execute those instructions by a processor to perform the machine processing tasks discussed herein, such as the engine operations discussed above. Specifically, FIG. 6 shows a diagrammatic representation of a machine in the example form of a computer system 600 within which instructions 624 (e.g., software) for causing the machine to perform any one or more of the methodologies discussed herein may be executed. In alternative embodiments, the machine operates as a standalone device or may be connected (e.g., networked) to other machines, for instance, via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 604, and a static memory 606, which are configured to communicate with each other via a bus 608. The computer system 600 may further include a graphics display unit 610 (e.g., a plasma display panel (PDP), a liquid crystal display (LCD), a projector, or a cathode ray tube (CRT)). The computer system 600 may also include alphanumeric input device 612 (e.g., a keyboard), a cursor control device 614 (e.g., a mouse, a trackball, a joystick, a motion sensor, or other pointing instrument), a data store 616, a signal generation device 618 (e.g., a speaker), and a network interface device 620, which also is configured to communicate via the bus 608.

The data store 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via network interface 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "engine" refers to computational logic for providing the specified functionality. An engine can be implemented in hardware, firmware, and/or software. Where the engines described herein are implemented as software, the engine can be implemented as a standalone program, but can also be implemented through other means, for example as part of a larger program, as any number of separate programs, or as one or more statically or dynamically linked libraries. It will be understood that the named engines described herein represent one embodiment, and other embodiments may include other engines. In addition, other embodiments may lack engines described herein and/or distribute the described functionality among the engines in a different manner. Additionally, the functionalities attributed to more than one engine can be incorporated into a single engine. In an embodiment where the engines as implemented by software, they are stored on a computer readable persistent storage device (e.g., hard disk), loaded into the memory, and executed by one or more processors as described above in connection with FIG. 6. Alternatively, hardware or software engines may be stored elsewhere within a computing system.

As referenced herein, a computer or computing system includes hardware elements used for the operations described here regardless of specific reference in FIG. 6 to such elements, including, for example, one or more processors, high-speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A system comprising at least one processor and memory storing instructions that cause the system to:
provide a graphical user interface that includes at least a map of a geographic location;
provide one or more metrics associated with the geographic location in a region of the interface, wherein at least one metric is determined based on at least one data point of the geographic location that is processed by a machine learning model;
determine a selection of a region in the map of the geographic location, wherein the selected region is designated for land conversion;
determine changes to the one or more metrics associated with the geographic location in response to the region selected for land conversion; and
provide information describing the changes to the one or more metrics in another region of the interface.

2. The system of claim 1, wherein the interface provides an option to digitally draw physical boundaries of the region within the map of the geographic location.

3. The system of claim 1, wherein the interface provides an option to specify new attributes for the region designated for land conversion, the new attributes including at least a new habitat type planned for the region.

4. The system of claim 1, wherein the changes to the one or more metrics include one or more of: a change to a biodiversity measurement associated with the geographic location; a change to a carbon measurement associated with the geographic location; a change to an air quality measurement associated with the geographic location; a change to a flood risk measurement associated with the geographic location; a change to a timber measurement associated with the geographic location; a change to a food production measurement associated with the geographic location; a change to a pollination measurement associated with the geographic location; a change to a natural capital measurement associated with the geographic location; a change to a monetary value measurement associated with the geographic location; a change to a societal value measurement associated with the geographic location; or a change to a tree measurement associated with the geographic location.

5. The system of claim 1, wherein the instructions further cause the system to:
provide read-only access to the interface to at least one third-party tasked with approving the land conversion.

6. A non-transitory computer-readable medium comprising executable instructions, the executable instructions being executable by one or more processors to perform a method, the method comprising:
providing a graphical user interface that includes at least a map of a geographic location;
providing one or more metrics associated with the geographic location in a region of the interface, wherein at least one metric is determined based on at least one data point of the geographic location that is processed by a machine learning model;
determining a selection of a region in the map of the geographic location, wherein the selected region is designated for land conversion;
determining changes to the one or more metrics associated with the geographic location in response to the region selected for land conversion; and
providing information describing the changes to the one or more metrics in another region of the interface.

7. The non-transitory computer-readable medium of claim 6, wherein the interface provides an option to digitally draw physical boundaries of the region within the map of the geographic location.

8. The non-transitory computer-readable medium of claim 6, wherein the interface provides an option to specify new attributes for the region designated for land conversion, the new attributes including at least a new habitat type planned for the region.

9. The non-transitory computer-readable medium of claim 6, wherein the changes to the one or more metrics include one or more of: a change to a biodiversity measurement associated with the geographic location; a change to a carbon measurement associated with the geographic location; a change to an air quality measurement associated with the geographic location; a change to a flood risk measurement associated with the geographic location; a change to a timber measurement associated with the geographic location; a change to a food production measurement associated with the geographic location; a change to a pollination measurement associated with the geographic location; a change to a natural capital measurement associated with the geographic location; a change to a monetary value measurement associated with the geographic location; a change to a societal value measurement associated with the geographic location; or a change to a tree measurement associated with the geographic location.

10. The non-transitory computer-readable medium of claim 6, the method further comprising providing read-only access to the interface to at least one third-party tasked with approving the land conversion.

11. A method performed by one or more processors, the method comprising:
providing a graphical user interface that includes at least a map of a geographic location;
providing one or more metrics associated with the geographic location in a region of the interface, wherein at least one metric is determined based on at least one data point of the geographic location that is processed by a machine learning model;
determining a selection of a region in the map of the geographic location, wherein the selected region is designated for land conversion;
determining changes to the one or more metrics associated with the geographic location in response to the region selected for land conversion; and
providing information describing the changes to the one or more metrics in another region of the interface.

12. The method of claim 11, wherein the interface provides an option to digitally draw physical boundaries of the region within the map of the geographic location.

13. The method of claim 11, wherein the interface provides an option to specify new attributes for the region designated for land conversion, the new attributes including at least a new habitat type planned for the region.

14. The method of claim 11, wherein the changes to the one or more metrics include one or more of: a change to a biodiversity measurement associated with the geographic location; a change to a carbon measurement associated with the geographic location; a change to an air quality measurement associated with the geographic location; a change to a flood risk measurement associated with the geographic location; a change to a timber measurement associated with the geographic location; a change to a food production measurement associated with the geographic location; a change to a pollination measurement associated with the geographic location; a change to a natural capital measurement associated with the geographic location; a change to a monetary value measurement associated with the geographic location; a change to a societal value measurement associated with the geographic location; or a change to a tree measurement associated with the geographic location.

15. The method of claim 11, further comprising providing read-only access to the interface to at least one third-party tasked with approving the land conversion.

\* \* \* \* \*